(12) United States Patent
Kocharlakota

(10) Patent No.: US 7,272,217 B1
(45) Date of Patent: Sep. 18, 2007

(54) TELECOMMUNICATIONS CALL TIME SLICING SYSTEM AND METHOD

(75) Inventor: Rao Kocharlakota, Shrewsbury, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/212,714

(22) Filed: Dec. 16, 1998

(51) Int. Cl.
H04M 15/06 (2006.01)

(52) U.S. Cl. .............. 379/114.24; 379/100.06; 379/265.05; 370/385

(58) Field of Classification Search .......... 379/88.01, 379/114.09, 114.05, 265.02, 265.11, 202.01, 379/266.01, 72, 76, 114.25, 114.13, 100.06, 379/114.01, 207.12, 212.01, 265.03, 265.05, 379/126, 114.24; 370/352, 385
See application file for complete search history.

(56) References Cited

U.S. PATENT DOCUMENTS

| | | | | |
|---|---|---|---|---|
| 4,811,382 A * | 3/1989 | Sleevi | .............. | 379/202.01 |
| 5,027,387 A * | 6/1991 | Moll | .............. | 379/114.01 |
| 5,247,571 A * | 9/1993 | Kay et al. | .............. | 370/385 |
| 5,271,058 A * | 12/1993 | Andrews et al. | .............. | 379/265.03 |
| 5,321,740 A * | 6/1994 | Gregorek et al. | .............. | 379/100.06 |
| 5,333,186 A * | 7/1994 | Gupta | .............. | 379/114.09 |
| 5,381,467 A | 1/1995 | Rosinski et al. | | |
| 5,430,782 A | 7/1995 | Brady et al. | | |
| 5,440,541 A * | 8/1995 | Iida et al. | .............. | 370/352 |
| 5,515,424 A | 5/1996 | Kenney | | |
| 5,555,290 A * | 9/1996 | McLeod et al. | .............. | 379/114.05 |
| 5,745,553 A | 4/1998 | Mirville et al. | | |
| 5,799,285 A | 8/1998 | Klingman | | |
| 5,946,378 A * | 8/1999 | Farfan | .............. | 379/212.01 |
| 6,298,127 B1 * | 10/2001 | Petrunka | .............. | 379/126 |

* cited by examiner

*Primary Examiner*—Gerald Gauthier

(57) ABSTRACT

A telecommunications system and method provides a time slicing capability whereby alternate services, such as advertising, can be provided to a party while being kept on hold. Thus, charges associated with portions of the call during which alternate services are provided can be billed to other parties, such as advertisers, and the cost for the call to the caller or the called party can be reduced. The connection between the caller and the called party is maintained during the time that alternate services are being provided so that when either the caller or the called party is available to accept or resume a call, the alternate services are terminated and the caller and called party are reconnected.

21 Claims, 3 Drawing Sheets

TELECOMMUNICATIONS CALL TIME SLICING SYSTEM AND METHOD

BACKGROUND OF THE INVENTION

1. Field of Invention

This invention relates to time slicing a telephone call so that charges associated with different portions of the call can be attributed to two or more parties.

2. Description of Related Art

Subscribers of toll-free calling services, e.g., 800 calling services, provide toll-free services to encourage or ease the process for customers calling the subscriber. However, callers are occasionally kept on hold when calling a subscriber because the subscriber does not have enough agents available to receive the incoming calls, or for other reasons. Thus, the subscriber must pay for portions of incoming calls while the caller is on hold and no business is being transacted. In fact, either the caller or a called party often must pay for portions of telephone calls when the called party is on hold, e.g., when a caller is put on hold after calling a called party that has a call waiting service.

SUMMARY OF THE INVENTION

The invention provides a call time slicing system and method that allows charges corresponding to different portions of a single call to be billed to two or more parties. In one aspect of the invention, a caller making a call to a subscriber of a toll-free calling service, e.g., an 800 service, is initially connected to the subscriber. If the subscriber, or its agents, are not available to receive the call, the caller is connected to a second party or device that provides alternate services to the caller while the caller waits to be connected to the subscriber. As one example, the alternate services can be an advertising message that is played to the caller while on hold. When the subscriber or its agents are available to receive the call, the alternate services are terminated and the caller is reconnected with the subscriber. Thus, since the caller is provided alternate services while kept on hold, the portion of the call during which the alternate services are provided can be billed to another party, e.g., a company providing the advertising message. The subscriber is only charged for portions of the call during which the caller is interacting with the subscriber.

While on hold, the caller can be connected with two or more alternate parties or a device or devices that provide two or more different alternate services. For example, two or more different advertising messages could be provided to the caller while waiting for the called subscriber to receive the call. The subscriber can designate that the incoming call can be received by entering a key or sequence of keys or other signal. Likewise, the subscriber can indicate that a caller is being put on hold and an alternate service should be provided by entering a key or sequence of keys, or a lack of activity between the caller and the subscriber, e.g., no detected voice activity, can trigger the initiation of alternate services presentation. Once alternate services have begun to be provided, the alternate services can be interrupted while in process, or the caller can be reconnected to the subscriber after the alternate services have concluded. For example, if a caller is placed on hold and a commercial message is begun, the system can wait to reconnect the caller with the subscriber until after the commercial message is completed, or interrupt the commercial message midstream to reconnect the subscriber and caller.

In a preferred embodiment, an existing telecommunications system is configured to provide alternate services while a caller is placed on hold. A time-domain multiplexing (TDM) telecommunications system including an asynchronous transfer mode (ATM) backbone network having a multipoint-to-multipoint capability is used to connect a caller with a subscriber and provide alternate services. Typically, the call from the caller to the subscriber is terminated in an automatic call distributor (ACD) maintained by the subscriber. If there is no activity between the caller and the subscriber, the system connects the caller to a device, such as an intelligent peripheral (IP), that provides alternate services while the subscriber is not available to receive the call. Alternate services presentation can be triggered when a device, such as another IP, detects that there is no voice activity occurring between the caller and the subscriber. When the subscriber is available to receive the call, the subscriber notifies the system and the caller is reconnected to the subscriber. As discussed above, reconnection can be initiated by the subscriber entering a key, or series of keys, or by another suitable method. The alternate services, e.g., a commercial message, can be interrupted to reconnect the caller and the subscriber, or reconnection can be delayed until the alternate service has concluded. Information regarding whether the subscriber is using the invention, the locations of IPs and the types of alternate services to be provided, the key or sequence of keys to be used to trigger subscriber/caller reconnect, whether the alternate service should be interrupted to perform reconnect, etc. are preferably stored by the telecommunications system, for example in a system control point (SCP), which essentially serves as a database/controller. In some implementations, the SCP keeps track of the status of available agents at the subscriber site. If no agents are available, the SCP holds the call until an agent is available. This aspect of the invention frees SCP resources from keeping track of subscriber resources.

These and other aspects of the invention will be apparent or obvious from the detailed discussion of the invention below.

BRIEF DESCRIPTION OF THE DRAWINGS

The invention is described in detail with regard to the following figures wherein like numerals reference like elements, and wherein.

DETAILED DESCRIPTION OF PREFERRED EMBODIMENTS

The term caller is used to refer to a person or device, such as a programmed facsimile device or general purpose computer, that initiates a telephone call. The term subscriber is used to refer to a person, business entity or device that is being called by a caller and is associated with call time slicing services in accordance with the invention. That is, if the subscriber is not available to receive a call from a caller, alternate services are provided to the caller while the caller waits for the subscriber to become available.

Figure 1:
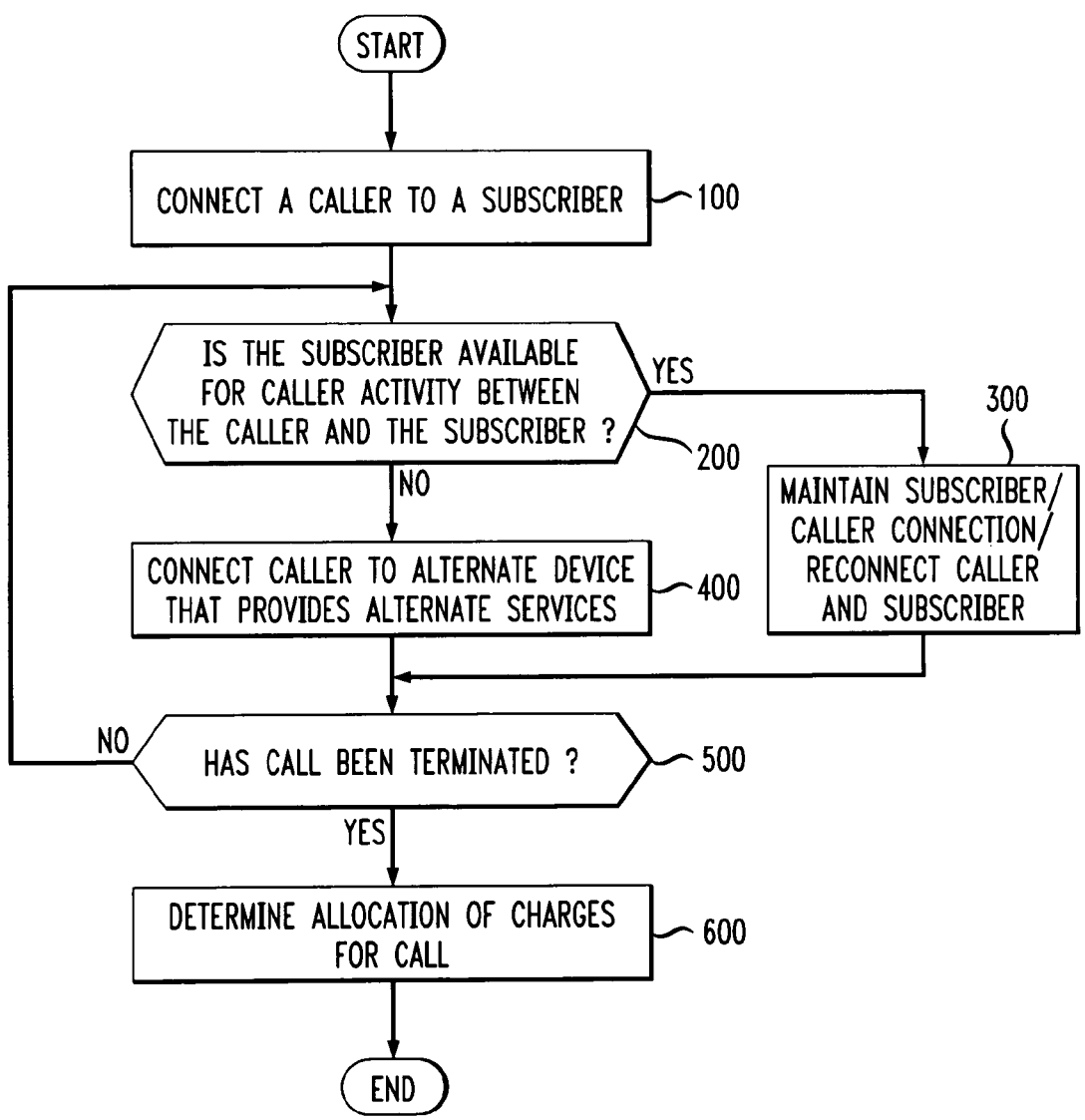
FIG. 1 is a flowchart of steps of a first method for time slicing a call.

FIG. 1 is a flowchart of steps for a method of time slicing a call. In step 100, a caller is connected to a subscriber.

Typically, the caller is connected to a subscriber through a telecommunications network by the caller dialing a telephone number corresponding to the subscriber. As discussed above, the caller can be a person or device, such as a programmed facsimile device or general purpose computer. Likewise, the subscriber can be a person or group of persons or a device or array of devices, such as facsimile devices, modems, etc. The telecommunications network can be an array of switching devices and associated control circuitry and devices as are well known in the art. The telecommunications network can be wired or wireless or a combination of wired and wireless communication services. In short, any communications system capable of providing voice and/or data communications between two points can be used.

In step 200, a determination is made whether the subscriber is available for caller activity between the caller and the subscriber. This determination can be a determination whether the subscriber has an available agent to speak with the caller, or a determination whether the subscriber is available to receive data or other information from the caller, e.g., a facsimile transmission. This determination can be made by receiving a signal from the subscriber that it is unavailable to receive the call or by detecting a lack of voice or data transmission activity between the caller and the subscriber after the initial connection is made, or by the SCP looking at subscriber resources. Typically, the caller is connected to an automatic call distributor (ACD) maintained by the subscriber in step 100; and if the subscriber is not available to receive the call, the caller is placed on hold. Thus, the determination in step 200 can include detecting that the caller has been placed on hold. As is well known, the caller can be placed on hold by a subscriber either at the time of initial connection to the subscriber and/or at some other arbitrary point during the call. Thus, the determination in step 200, whether the subscriber is available for caller activity can occur upon initial connection between the caller and the subscriber, or at a later time during the call.

If the subscriber is available for caller activity, in step 300 the connection between the subscriber and caller is maintained. (If alternate services were being provided, the caller and subscriber are reconnected in step 300.) However, if the subscriber is not available for caller activity, the caller is connected to an alternate device that provides alternate services in step 400. As discussed above, the alternate services can include an advertising message or other information services. For example, the caller could be provided with a menu of service or information options that can be received. The caller could select one of the options and receive information such as a horoscope, weather report, etc. The alternate services could be provided based on prerecorded information, or provided live by a person. The alternate services provided can be provided aurally and/or visually, in the case where the caller has video display capability in addition to audio reproduction capabilities. Information can also be provided in other forms, such as a facsimile transmission. For example, a caller could call a customer service number associated with a recently purchased printer. In this example, the called customer service center is not initially available to receive the call, and the caller is provided with alternate services while on hold. The alternate services could be advertising information related to replaceable ink cartridges that can be used with the printer that is transmitted back to the caller in audio, audio-visual, or other data format. For example, the communication device used by the caller to call the customer service center could have the capability of receiving facsimile transmissions. Thus, the advertising information regarding the ink cartridges could be provided to the communication device in a facsimile transmission data format. The information could be later printed or otherwise displayed to a user.

The alternate device that the caller is connected to in step 400 can be a storage/communications device that stores alternate services information and provides the information to the caller. Optionally, the alternate device could be a communications device maintained by an alternate service provider, e.g., an advertising company, rather than by the telecommunications service provider.

In step 500, a determination is made whether the call has been terminated. The call can be terminated, for example, by the caller hanging up or otherwise disconnecting from the subscriber or alternate services device. If the call has not been terminated, flow jumps back to step 200 where a determination is again made whether the subscriber is available for caller activity. If the call has been terminated, an allocation of the charges for the call is made in step 600. In this example, the subscriber maintains a toll-free service, e.g., an 800 service, and thus would normally be charged for the entire length of time of the call. However, if the caller was provided with alternate services in step 400, the portion of the call during which alternate services were provided is not charged to the subscriber. Instead, that portion of the call during which alternate services were provided is charged to the alternate service provider, the caller, or some other entity, e.g., an advertiser.

Although the example where a subscriber maintains a toll-free service has been described, the invention can be used in other scenarios. For example, the invention can be used in situations where the caller makes a toll call to a subscriber, and if the subscriber is not available for caller activity, the caller is connected to an alternate device that provides alternate services during the time that the caller is on hold. Thus, the caller would not be charged for that portion of the call during which alternate services were provided. Instead, the alternate services provider or some other entity would be charged for the portion of the call during which alternate services were provided.

In addition, the caller need not be connected only to a single alternate device that provides alternate services. Instead, the caller could be connected to a first alternate device that provides first alternate services. When the first alternate services are concluded, the caller could be connected to a second alternate device, and so on. Thus, the call can be "sliced" into multiple segments where different segments of the call are charged to different entities depending on what happened during each segment of the call.

In addition, the subscriber and caller need not be immediately reconnected when the subscriber is available for caller activity. Instead, if alternate services are being provided, the caller and subscriber could be reconnected only after the alternate services have concluded.

Further, the alternate services could only be made available when the caller is placed on hold after initially being connected to the subscriber. Thus, if the caller is placed on hold by the subscriber at a later time during the call, alternate services providing could be blocked. In contrast, alternate services could be provided at any time during the call that the caller is placed on hold, or the subscriber is otherwise unavailable for caller activity.

Although the method above has been described such that only the caller can be provided alternate services, the invention can be modified to provide alternate services to the subscriber, or called party, in addition to the caller. For example, a caller could initiate a call to another called party and then later place the called party on hold. During this period, the called party could be provided alternate services, thereby reducing the total charges to the caller for making the call. In this case, a determination would have to be made regarding which of the caller or the called party has been placed on hold so that alternate services can be provided to the appropriate party.

Figure 2:
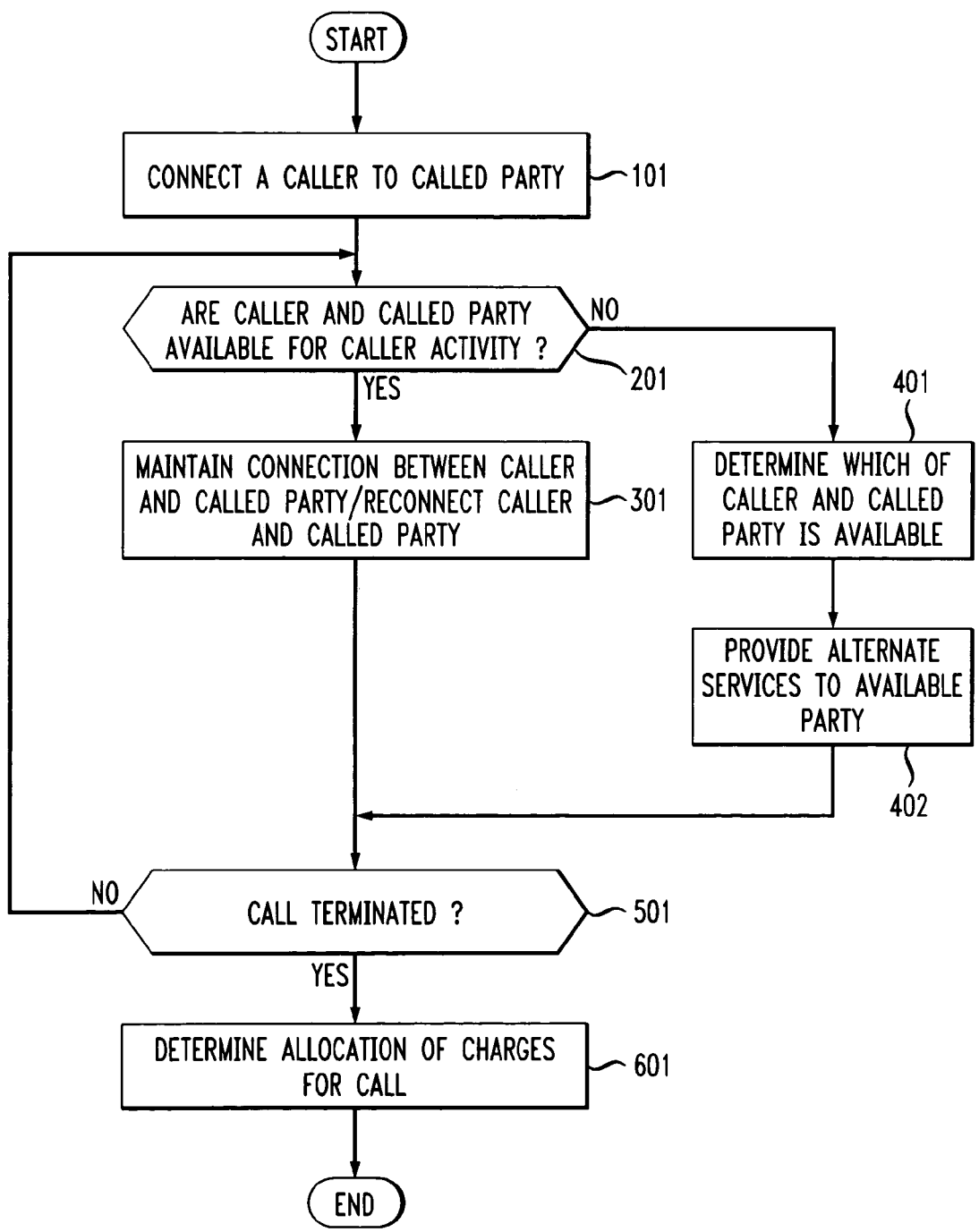
FIG. 2 is a flowchart of steps of a second method for time slicing a call.

FIG. 2 is a flowchart of steps for a method of time slicing a call in which alternate services are provided to either the caller or the called party. In step 101, a caller is connected to a called party. In step 201, a determination is made whether the caller and the called party are available for caller activity. If both the caller and the called party are available for caller activity, in step 301 the connection between the caller and the called party is maintained. (If alternate services are or were being provided to either the caller or the called party, the caller and the called party are reconnected in step 301.)

If either the caller or the called party are not available for caller activity, in step 401 a determination is made regarding which party is unavailable. In step 402, alternate services are provided to the available party, which can be either the caller or the called party.

In step 501, a determination is made whether the call has been terminated. If not, flow jumps back to step 201. If the call has been terminated, the charges for the call are allocated appropriately in step 601. For example, in a case where the caller would normally be charged for the entire length of time that the caller and the called party are connected, including any time that the called party or the caller is placed on hold, in this example, the caller is charged only for that portion of the call that the caller and the called party are actually connected and interacting. Other portions of the call when alternate services are provided are charged to either the called party, an alternate service provider, the caller or another party, as appropriate.

The method shown in FIG. 2 can be useful in situations where, for example, the called party has a call waiting service. Currently, if the caller calls a called party having a call waiting service, the caller can be charged for time that the caller is connected to the called party, but not engaging in caller activity, e.g., communicating with the called party. In this example, the caller could be provided with alternate services, e.g., advertising messages, during the time that the caller is waiting to communicate with the called party. Thus, the caller would normally not be charged for time during which the alternate services are being provided. Of course, this is only one exemplary application for the invention. The invention can be used in any communication system where the caller and called party temporarily stop communicating while one of the parties is placed on hold.

Figure 3:
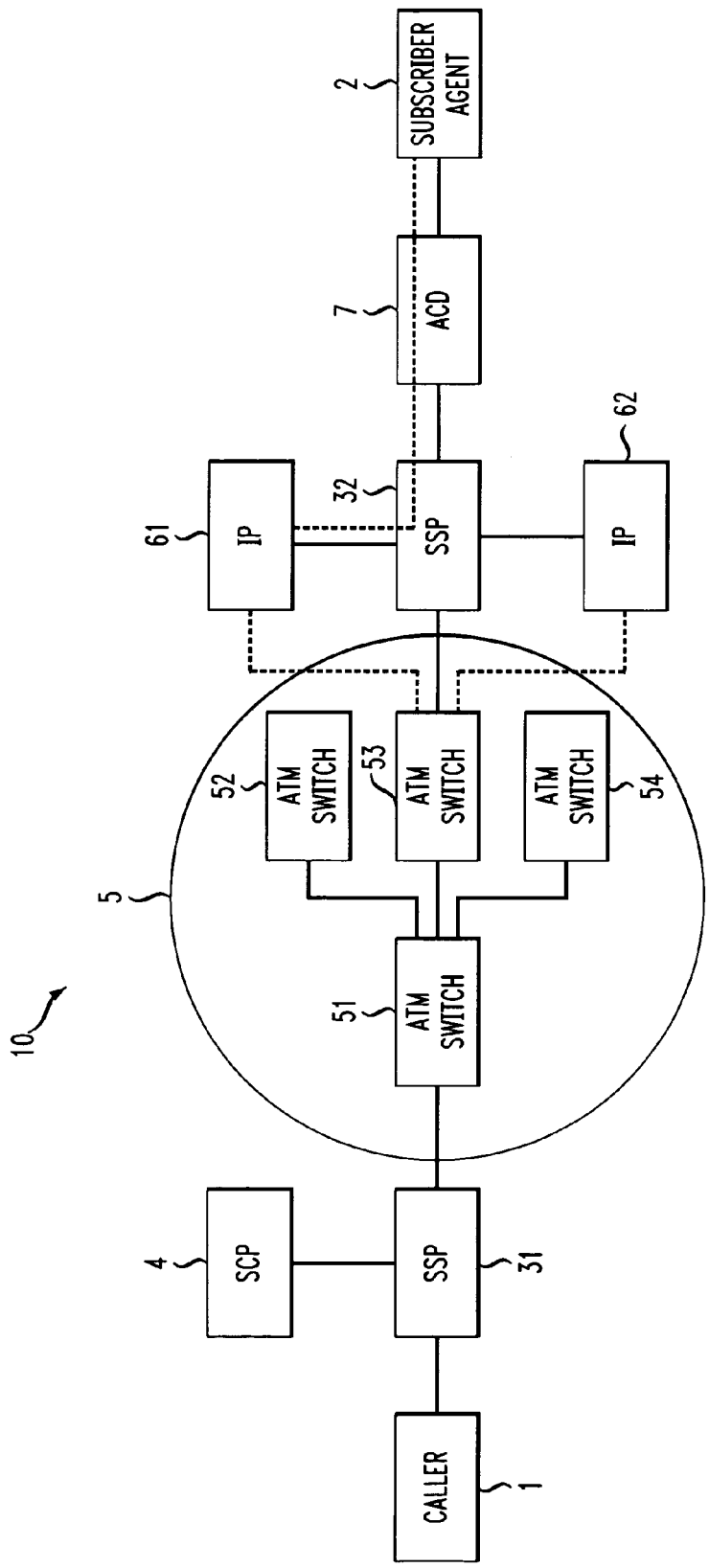
FIG. 3 is a schematic block diagram of a telecommunications system configured in accordance with the invention.

FIG. 3 is a schematic block diagram of an exemplary telecommunications system configured in accordance with the invention. The telecommunications system 10 is a TDM network having an ATM backbone 5. As one example, a caller 1 dials a toll-free number, e.g., an 800 number, that designates a subscriber 2 that the caller 1 would like to call. A service switching point 31 (SSP) receives the number and queries a system control point 4 (SCP) regarding the number. The SCP 4 returns an indication to the SSP 31 that the number is associated with a time sliced service and other information regarding the time sliced service to be provided. The other information regarding the time sliced service can include the announcement numbers and locations of intelligent peripherals (IPs) that will provide alternate services, a key or sequence of keys that designate a subscriber 2 is available for caller activity, an indication whether an alternate service in progress should be completed or interrupted when the subscriber 2 indicates availability, and/or an indication whether voice activity detection or other detection features should be active after a first set of alternate services are provided.

The SSP 31 indicates to the ATM backbone 5 to establish a multipoint-to-multipoint connection with the ATM end point of the caller 1 as the root and the subscriber 2 as a first leaf (leaf1). The SSP 31 also indicates that the call to the subscriber 2 should pass through an IP 61 capable of detecting subscriber 2's availability. The ATM backbone 5 connects the caller 1 to an automatic call distributor (ACD) 7 for the subscriber 2 through a set of ATM switches 51-54 and a destination SSP 32. In this example, the IP 61 detects that the subscriber 2 is not available to receive caller 1's call by detecting a lack of voice activity after a specified amount of time after the call is first received by the ACD 7. However, the IP 61 could determine that the subscriber 2 is unavailable in other ways, including detecting a lack of data transmission, receiving a signal from the subscriber 2 representing subscriber 2's unavailability, etc. Alternately, this determination can be made by the SCP 4 if the SCP 4 keeps track of subscriber resources.

When the IP 61 detects that the subscriber 2 is unavailable, the destination SSP 32 queries the SCP 4. The SCP 4 provides instructions to connect the caller 1 with an IP 62 that provides alternate services to the caller 1 while the subscriber 2 is unavailable. In this example, the IP 62 stores commercial messages and plays the commercial messages to the caller 1 while the subscriber 2 is unavailable. However, as discussed above, the IP 62 could provide other services or information to the caller 1 as desired. In addition, the caller 1 could be connected to another subscriber 2 or other party (not shown) rather than the IP 62 to receive alternate services. In this example, the IP 62 is the second leaf (leaf2) of the multipoint-to-multipoint connection in the telecommunications system 10.

Each time an alternate service, e.g., a commercial message, is provided, a billing record is made for the company or other entity that owns the alternate service as if a call were made to a toll-free number owned by the company or entity. In addition, the amount of time spent or value associated with providing the alternate services is deducted from the total call minutes of or charges for the call from the caller 1 to the subscriber 2. Thus, the call from the caller 1 to the subscriber 2 can be sliced into several different portions where each portion of the call attributable to a different subscriber 2 or other entity is billed to the appropriate subscriber 2 or entity.

When the subscriber 2 is available to receive caller 1's call, the subscriber 2 indicates its availability. The subscriber 2 can indicate its availability by pressing a key or sequence of keys that are recognized by the destination SSP 32 or by providing some other indication, such as a voice message recognized by the IP 61, etc.

If the IP 62 is in the middle of providing alternate services, the destination SSP 32 will either terminate the alternate services and reconnect the caller 1 to the subscriber 2, or wait until the alternate services are completed before reconnecting the caller 1 and the subscriber 2. This determination whether to interrupt the alternate services or wait until services are complete is made based on information provided by the SCP 4.

After the caller 1 and the subscriber 2 are reconnected, the IP 61 can start subscriber availability detection, e.g., voice activity detection, to again connect the caller 1 to the IP 62 if the subscriber 2 places the caller 1 on hold again. Alternately, alternate services could be blocked if the subscriber 2 places the caller 1 on hold after the caller 1 and the subscriber 2 are initially reconnected. That is, alternate services may be provided only if the caller 1 is placed on hold immediately after the caller 1 is initially connected to the subscriber 2, if desired.

After the call is terminated, e.g., the caller 1 or the subscriber 2 hangs up the phone, the call and all multipoint-to-multipoint connections are terminated and a billing record is created for the call. As discussed above, portions of the call during which alternate services are provided are typically not billed to the subscriber 2, but instead are billed to the caller 1 or another entity, e.g., an advertiser. The caller 1 might be billed in a situation where the caller chooses to accept alternate services, such as a weather report or other service typical of a 900-type call.

Although the telecommunications system 10 is described above in connection with a subscriber 2 that provides a toll-free calling service and associated time slicing services, the telecommunications system 10 could be configured to provide two-way time slicing services as discussed above in connection with FIG. 2. For example, the call originated by the caller 1 could be a toll call that is normally charged to the caller 1, and when the subscriber 2 places the caller 1 on hold, alternate services provided to the caller 1 would be deducted from the caller's 1 charges for the call. In addition, alternate services could be provided to a called party if the caller places the called party on hold. In that case, time slicing services are associated with the calling party and corresponding information is stored in the SCP 4 or other control database.

While this invention has been described in conjunction with specific embodiments thereof, it is evident that many alternatives, modifications and variations will be apparent to those skilled in the art. Accordingly, preferred embodiments of the invention as set forth herein are intended to be illustrative and not limiting. Various changes may be made without departing from the spirit and scope of the invention.

What is claimed is:

1. A method of time slicing a telecommunications call, comprising:
   connecting a caller to a subscriber of a time slicing service; then:
   determining if the subscriber is available to continue the call from the caller;
   connecting the caller to an alternate device that provides alternate services when the subscriber is not available to continue the call;
   terminating the alternate services and resuming communication between the caller to the subscriber when the subscriber is available to continue the call; and
   determining a portion of total call charges associated with the call that is attributable to at least one entity other than the subscriber based on the alternate services provided by said alternate device.

2. The method of claim 1, wherein the step of connecting a caller comprises:
   connecting the caller to an automatic call distributor associated with the subscriber.

3. The method of claim 1, wherein the step of connecting a caller comprises:
   connecting the caller to the subscriber through a telecommunications system having an ATM backbone.

4. The method of claim 1, wherein the step of connecting a caller comprises:
   determining if the subscriber is associated with time slicing services; and
   determining at least one of an alternate device that provides alternate services, a key sequence that indicates the subscriber is available to receive a call, whether alternate services in progress should be completed or interrupted when reconnecting a caller to the subscriber, and whether alternate services should be provided at any point after the subscriber receives the call.

5. A method of claim 1, wherein the step of connecting a caller comprises:
   routing the call through a device capable of detecting if the subscriber is available to receive the call.

6. The method of claim 1, wherein the step of determining if the subscriber is available comprises:
   detecting voice activity between the caller and the subscriber.

7. The method of claim 1, wherein the step of determining if the subscriber is available comprises:
   receiving a signal from the subscriber indicating that the subscriber is not available to receive the call.

8. The method of claim 1, wherein the step of connecting the caller to an alternate device comprises:
   maintaining the connection between the caller and the subscriber as active; and
   connecting the caller to an IP that provides the alternate services.

9. The method of claim 1, wherein the step of connecting the caller to an alternate device comprises:
   connecting the caller to a device that provides advertising information to the caller.

10. The method of claim 1, wherein the step of terminating the alternate services comprises:
    receiving a signal from the subscriber representing that the subscriber is available to receive the call.

11. The method of claim 1, wherein the step of terminating the alternate services comprises:
    receiving a signal representing that the subscriber is available to receive the call; and
    interrupting the alternate services to reconnect the caller and the subscriber.

12. The method of claim 1, wherein the step of terminating alternate services comprises:
    waiting until the alternate services are complete before reconnecting the caller and the subscriber.

13. The method of claim 1, wherein the step of determining a portion of total call charges comprises:
    allocating charges to an entity that owns advertising information that is provided to the caller during the call.

14. A method of time slicing a telecommunications call, comprising:
    connecting a caller to a called party; then:
    determining that one of the caller and the called party is not available for communication with the other of the caller and the called party;
    connecting the other of the caller and the called party to a device that provides alternate services while the caller or called party is not available;
    terminating the alternate services and resuming communication between the caller and the called party when both the caller and the called party are available for communication; and
    determining a portion of total call charges that are attributable to at least one of the caller, the called party and another entity based on the alternate services provided by said device.

15. A telecommunications system having a time slicing capability, comprising:

connecting means for connecting a caller to a called party;

availability determining means for determining that one of the caller and the called party after being connected is not available for communication with the other of the caller and the called party;

alternate services means for providing alternate services to the caller when the caller or called party is not available;

terminating means for terminating the alternate services and resuming communication between the caller and the called party when both the caller and the called party are available for communication; and charge determining means for determining a portion of total call charges that are attributable to at least one of the caller, the called party and another entity based on the alternate services provided by said alternate services means.

16. A telecommunications system having a time slicing capability, comprising:

an originating switch that receives a signal from a caller indicating a desire to be connected with a called party;

a controller that provides information regarding how the signal from the caller should be handled;

a destination switch that connects to the called party based on information from the controller;

a switching network that interconnects the originating switch with the destination switch;

a sensing device that detects that one of the caller and the called party after being connected is not available for communication; and an alternate services device that provides alternate services to the other of the caller and the called party while the caller or called party is unavailable;

wherein portions of the call during which alternate services are provided are charged to entities based on the alternate services provided by said alternate services device.

17. The system of claim 16, wherein the switching network is an ATM backbone having a multipoint-to-multipoint connection capability.

18. The system of claim 16, wherein the sensing device is an IP device that detects a lack of communication between the caller and the called party.

19. The system of claim 16, wherein the alternate services device is an IP that provides advertising information to the caller while the called party is unavailable.

20. The system of claim 19, wherein portions of the call during which advertising information is provided to the caller is charged to an advertiser associated with the advertising information.

21. The system of claim 16, wherein the sensing device comprises an SCP that does not keep track of called party resources.

* * * * *